US008339278B2

(12) United States Patent
Sakamoto et al.

(10) Patent No.: US 8,339,278 B2
(45) Date of Patent: Dec. 25, 2012

(54) ELECTRONIC SYSTEM WITH AC-DC CONVERTOR CONTROLLED BY RECEIVED SIGNAL AND AC-DC ADAPTOR

(75) Inventors: Takafumi Sakamoto, Machida (JP); Koji Ogura, Tachikawa (JP); Shoji Otaka, Yokohama (JP); Toshiyuki Umeda, Inagi (JP); Tsuyoshi Kogawa, Kawasaki (JP); Manabu Mukai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 633 days.

(21) Appl. No.: 12/559,821

(22) Filed: Sep. 15, 2009

(65) Prior Publication Data

US 2010/0231431 A1 Sep. 16, 2010

(30) Foreign Application Priority Data

Mar. 16, 2009 (JP) ................................ 2009-062868

(51) Int. Cl.
*G08C 19/22* (2006.01)
*H04Q 9/00* (2006.01)

(52) U.S. Cl. .............................. 340/870.07; 340/870.39

(58) Field of Classification Search ............. 340/870.07, 340/870.39, 870.4, 870.01
See application file for complete search history.

(56) References Cited

U.S. PATENT DOCUMENTS

| | | | | |
|---|---|---|---|---|
| 6,263,200 | B1 * | 7/2001 | Fujimoto | 455/343.5 |
| 6,307,358 | B1 * | 10/2001 | Conrad | 323/282 |
| 7,240,227 | B2 * | 7/2007 | Maezawa | 713/300 |
| 2006/0145535 | A1 * | 7/2006 | Kaneko | 307/1 |
| 2008/0100491 | A1 | 5/2008 | Umeda et al. | |
| 2008/0116854 | A1 * | 5/2008 | Park | 320/160 |
| 2009/0243541 | A1 * | 10/2009 | Jeong et al. | 320/108 |
| 2011/0134673 | A1 * | 6/2011 | Ho et al. | 363/127 |

FOREIGN PATENT DOCUMENTS

JP 2004-266931 9/2004

* cited by examiner

*Primary Examiner* — Peguy Jean Pierre
(74) *Attorney, Agent, or Firm* — Oblon, Spivak, McClelland, Maier & Neustadt, L.L.P.

(57) ABSTRACT

An electronic system includes: an AC-DC converter to convert an AC voltage into a DC voltage and to supply the DC voltage to a secondary battery; a first detector to detect a remaining amount of the secondary battery; a transmitter to transmit a signal corresponding to the remaining amount of the secondary battery; a receiver to receive the signal transmitted by the transmitter; and a controller to control the AC-DC converter using the signal received by the receiver.

13 Claims, 7 Drawing Sheets

ELECTRONIC SYSTEM WITH AC-DC CONVERTOR CONTROLLED BY RECEIVED SIGNAL AND AC-DC ADAPTOR

CROSS-REFERENCE TO RELATED APPLICATIONS

This application is based upon and claims the benefit of priority from the prior Japanese Patent Application No. 2009-062868, filed on Mar. 16, 2009; the entire contents of which are incorporated herein by reference.

BACKGROUND OF THE INVENTION

1. Field of the Invention

The present invention relates to an electronic system.

2. Description of the Related Art

Reduction of power consumption of an electronic system is in progress. For example, there is disclosed a technique to shut off an AC-DC converter from an AC power source by providing a power switch in an AC power source side of the AC-DC converter, so as to reduce power consumption at a standby time (see JP-A 2004-266931 (KOKAI)). When a user does not use the electronic device, the user turns off this power switch manually, and when the user uses the electronic device, the user turns on the power switch manually. As a result, reduction of power consumption at the standby time becomes possible.

However, in the above technology, it is necessary to turn on/off the power switch manually. Therefore, when the AC-DC converter is located in a place apart from the electronic device which the user uses, the user needs to go to the AC-DC converter when the user starts using and ends using the electronic device to turn on/off the power switch.

BRIEF SUMMARY OF THE INVENTION

An object of the present invention is to provide an electronic system capable of reducing power consumption without requiring a manual operation.

An electronic system according to an aspect of the present invention includes: an AC-DC converter to convert an AC voltage into a DC voltage and to supply the DC voltage to a secondary battery; a first detector to detect a remaining amount of the secondary battery; a transmitter to transmit a signal corresponding to the remaining amount of the secondary battery; a receiver to receive the signal transmitted by the transmitter; and a controller to control the AC-DC converter using the signal received by the receiver.

DETAILED DESCRIPTION OF THE INVENTION

Figure 1:
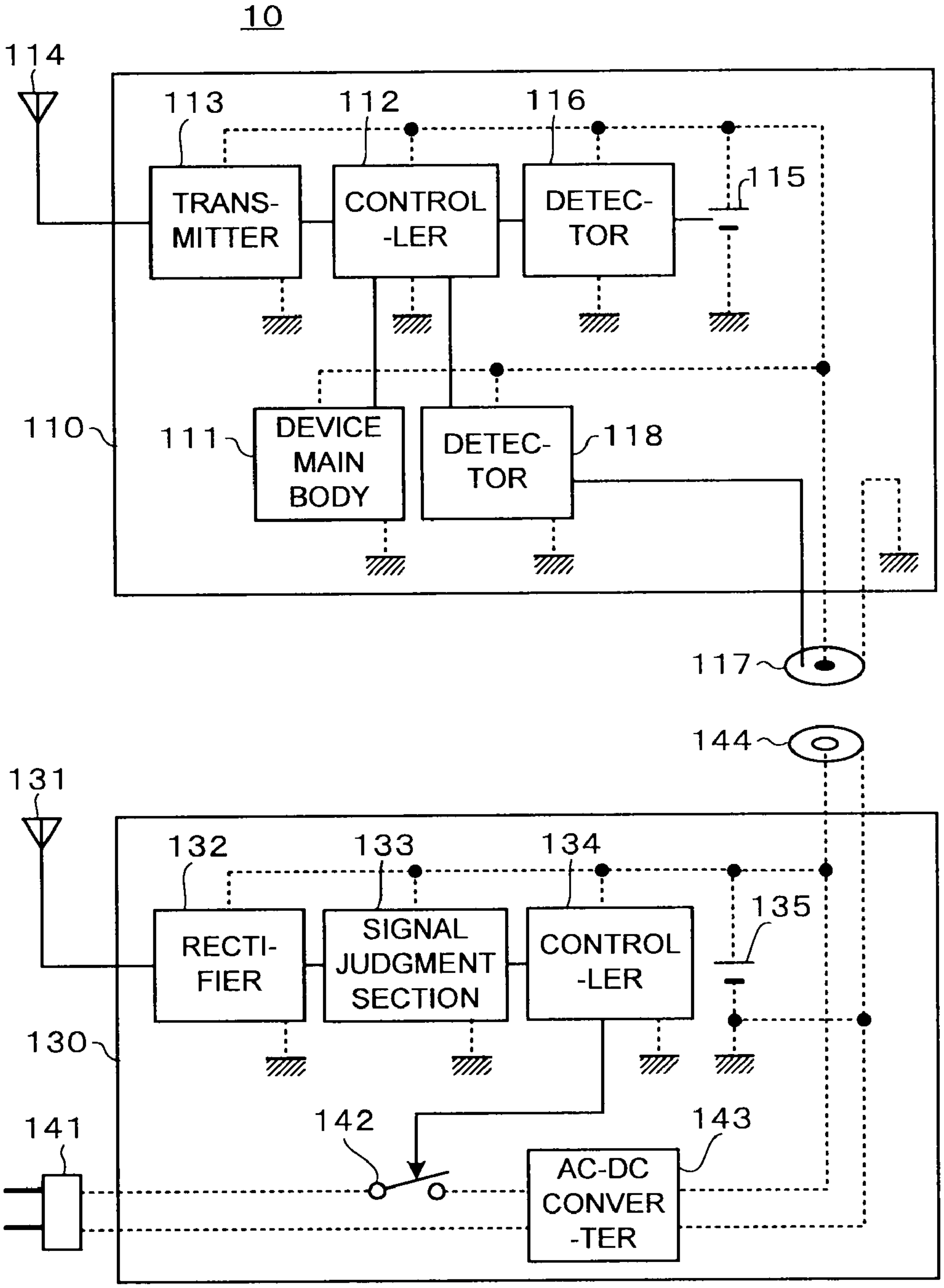
FIG. 1 is a block diagram showing an electronic system 10 according to an embodiment of the present invention.

Hereinafter, an embodiment of the present invention will be described in detail with reference to the drawings. FIG. 1 is a block diagram showing an electronic system 10 according to an embodiment of the present invention.

The electronic system 10 includes an electronic device 110 and an AC adaptor 130. From the electronic device 110 to the AC adaptor 130, control by radio is possible, and turning on/off at a previous stage of AC-DC conversion of the AC adaptor 130 can be controlled.

The electronic device 110 is, for example, a portable terminal device (a mobile personal computer (a notebook computer and the like), a mobile phone). The electronic device 110 includes a device main body 111, a controller 112, a transmitter 113, an antenna 114, a battery 115, a detector 116, a DC jack 117, and a detector 118.

The device main body 111 provides a main function (for example, a function as a computer) of the electronic device 110 for a user.

The controller 112 generates a control packet (an ON signal, an OFF signal) to be transmitted to the AC adaptor 130. The ON signal is a signal to instruct start of AC-DC conversion in the AC adaptor 130. The OFF signal is a signal to instruct stop of the AC-DC conversion in the AC adopter 130.

The transmitter 113 transmits the control packet generated by the controller 112 to the AC adaptor 130. The transmitter 113 transmits the ON signal and the OFF signal which are generated in the controller 112. For the transmitter 113, it is considered to use, for example, an LSI for wireless LAN. When a notebook personal computer is considered as an example of the electronic device 110, an LSI for wireless LAN is built therein at a high rate. In such a case, the LSI is usually operated as the LSI for wireless LAN, and only when receiving an instruction from the controller 112, the LSI is made to transmit a control packet by using a radio wave corresponding to a standard of the wireless LAN.

The antenna 114 emits the control packet as a radio wave.

The battery 115 supplies an electric power to the device main body 111, the controller 112, the transmitter 113, the detector 116, and the detector 118. The battery 115 is a secondary battery (a charging battery) charged by a DC voltage supplied from the AC adaptor 130.

The detector 116 detects a remaining amount of the battery 115. The detector 116 detects the remaining amount of the battery 115, for example, based on a voltage of the battery 115. The remaining amount can be indicated by, for example, 0% to 100%. The percentages 0% and 100% correspond to zero (none) and full of the remaining amount of the battery 115, respectively.

A DC plug 144 of the AC adaptor 130 is detachably connected to the DC jack 117. As a result that the DC plug 144 of the AC adaptor 130 is connected to the DC jack 117, the DC voltage from the AC adaptor 130 is supplied to the electronic device 110.

The detector 118 detects whether or not the DC plug 144 of the AC adaptor 130 is connected to the DC jack 117 and the DC voltage is supplied. Such detection can be performed by a mechanical or electric method.

The AC adaptor 130 includes an antenna 131, a rectifier 132, a signal judgment section 133, a controller 134, a battery 135, an AC plug 141, a switch 142, an AC-DC converter 143, and the DC plug 144.

The antenna 131 receives the control packet from the electronic device 110. The rectifier 132 rectifies the control packet received by the antenna 131. A combination of the antenna 131 and the rectifier 132 (or the antenna 131 alone) functions as a receiver to receive a signal transmitted by a transmitter. Details of the rectifier 132 will be described later.

The signal judgment section 133 judges whether or not the received control packet coincides with a predetermined control packet (an ON signal, an OFF signal) based on an output of the rectifier 132.

The controller 134 controls the switch 142 based on a judgment result of the signal judgment section 133. In other words, the controller 134 controls AC-DC conversion by the AC-DC converter 143 in correspondence with the signal transmitted by the transmitter 113.

The battery 135 supplies an electric power to the rectifier 132, the signal judgment section 133, and the controller 134. It should be noted that the battery 135 can be any one of a primary battery (a dry battery, a lithium battery or the like), a secondary battery (a charging battery, a supercapacitor or the like), and a solar battery. In a case that the secondary battery is used for the battery 135, for example, at a time of an ON state of the switch 142, a DC voltage can be supplied and charged from the AC-DC converter 143 to the battery 135.

The AC plug 141 is connected to an external power supply such as a power receptacle and supplies an AC voltage (an electric power) to the AC-DC converter 143.

The switch 142 switches whether or not to transmit the electric power supplied from the AC plug 141 to the AC-DC converter 143. As will be described later, even when the device main body 111 in the electronic device 110 is in an OFF state, the AC-DC converter 143 consumes an electric power. Thus, by turning on/off the switch 142 in correspondence with necessity of supply of the electric power to the electronic device 110, power consumption of the AC adaptor 130 can be reduced.

The AC-DC converter 143 converts the AC voltage supplied from the AC plug 141 into the DC voltage. The AC-DC converter 143 can be constituted by a transformer and a rectifier. The AC voltage is altered by the transformer and rectified by the rectifier, whereby the DC voltage is generated. The AC-DC converter 143, the transformer in particular, consumes an electric power even at a time of not supplying the electric power to the electronic device 110 (for example, at a standby time of the electronic device 110). Thus, by the switch 142, performing/not performing AC-DC conversion in the AC-DC converter 143 is switched, so that power consumption of the AC-DC converter 143 (AC adaptor 130) is reduced.

The DC plug 144 is connected to the DC jack 117 of the electronic device 110 and supplies the DC voltage (the electric power) to the electronic device 110.

(Details of Rectifier 132)

The rectifier 132 efficiently rectifies (detects) the signal received by the antenna 131 and is capable of an operation at low power consumption.

Figure 2:
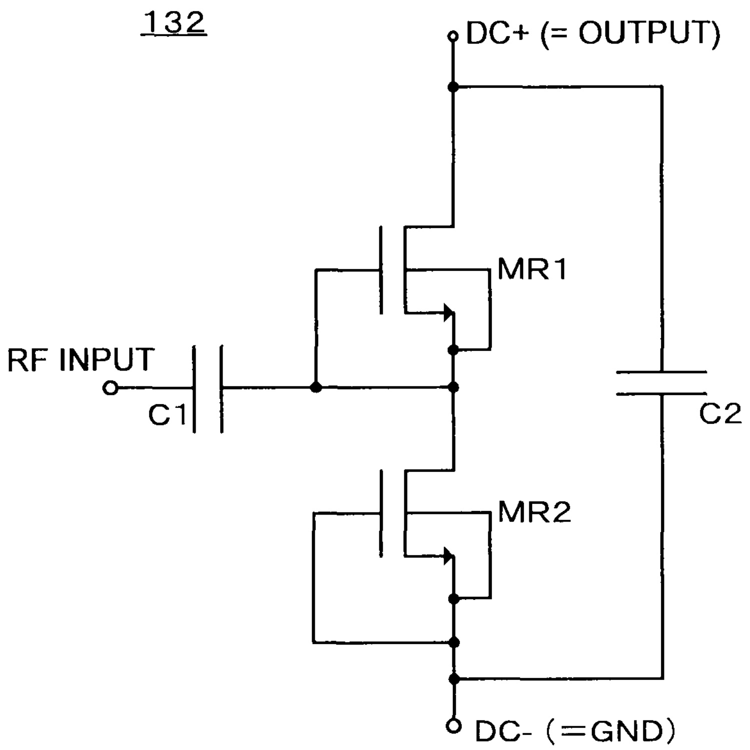
FIG. 2 is a circuit diagram showing a constitution example of a rectifier 132.

In FIG. 2, a constitution example of the rectifier 132 shown in FIG. 1 is shown. This rectifier 132 includes NMOS transistors MR1, MR2 which are connected in series. A gate and a source of the respective transistors MR1, MR2 are short-circuit connected (in other words, the transistors MR1, MR2 have a kind of diode connection). A capacitor C1 is connected to a wiring which connects the transistors MR1, MR2, and an RF signal is inputted therein from the antenna 131. Further, a smoothing capacitor C2 is connected to between a drain of the transistor MR1 and a source of the transistor MR2, thereby generating an output voltage (a rectified voltage).

As a result that the RF signal is inputted, a half-wave electric current flows in a path of the transistor MR1, the capacitor C2 and the transistor MR2. Consequently, a direct current output voltage (a rectified voltage) is generated in both ends of the capacitor C2. A lower side terminal DC− of the rectifier 132 shown in FIG. 2 is connected to ground. An upper side terminal DC+ of the rectifier 132 shown in FIG. 2 is connected to the signal judgment section 133 as an output terminal of the rectifier 132.

By using the rectifier 132 configured as above, a radio signal of a low electric power can be rectified efficiently. The rectifier 132 detects a signal highly sensitively by the electric power from the battery 135.

MODIFICATION EXAMPLE

Modification examples of the present invention will be described.

Figure 3:
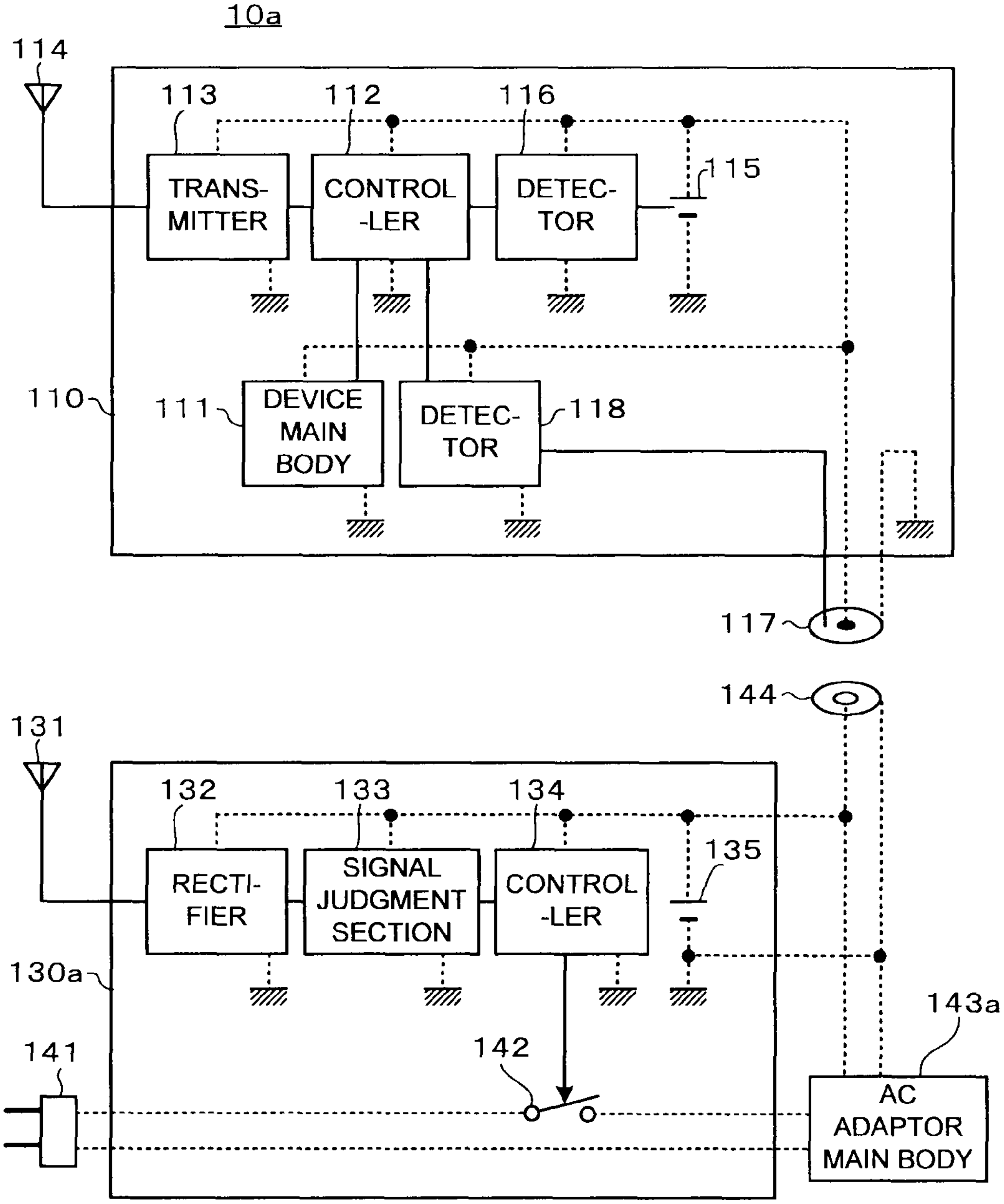
FIG. 3 is a block diagram showing an electronic system 10*a* according to a modification example 1 of the present invention.

FIG. 3 is a block diagram showing an electronic system 10*a* according to a modification example 1 of the present invention. In this modification example 1, the AC adaptor 130 of the electronic system 10 is divided into an AC adaptor controller 130*a* and an AC adaptor main body 143*a*. The Ac adaptor main body 143*a* corresponds to the AC-DC converter 143 of the electronic system 10, and converts an AC voltage to a DC voltage. With regard to points other than the above, the electronic system 10*a* is virtually not different from the electronic system 10, and detailed explanation will be omitted.

Figure 4:
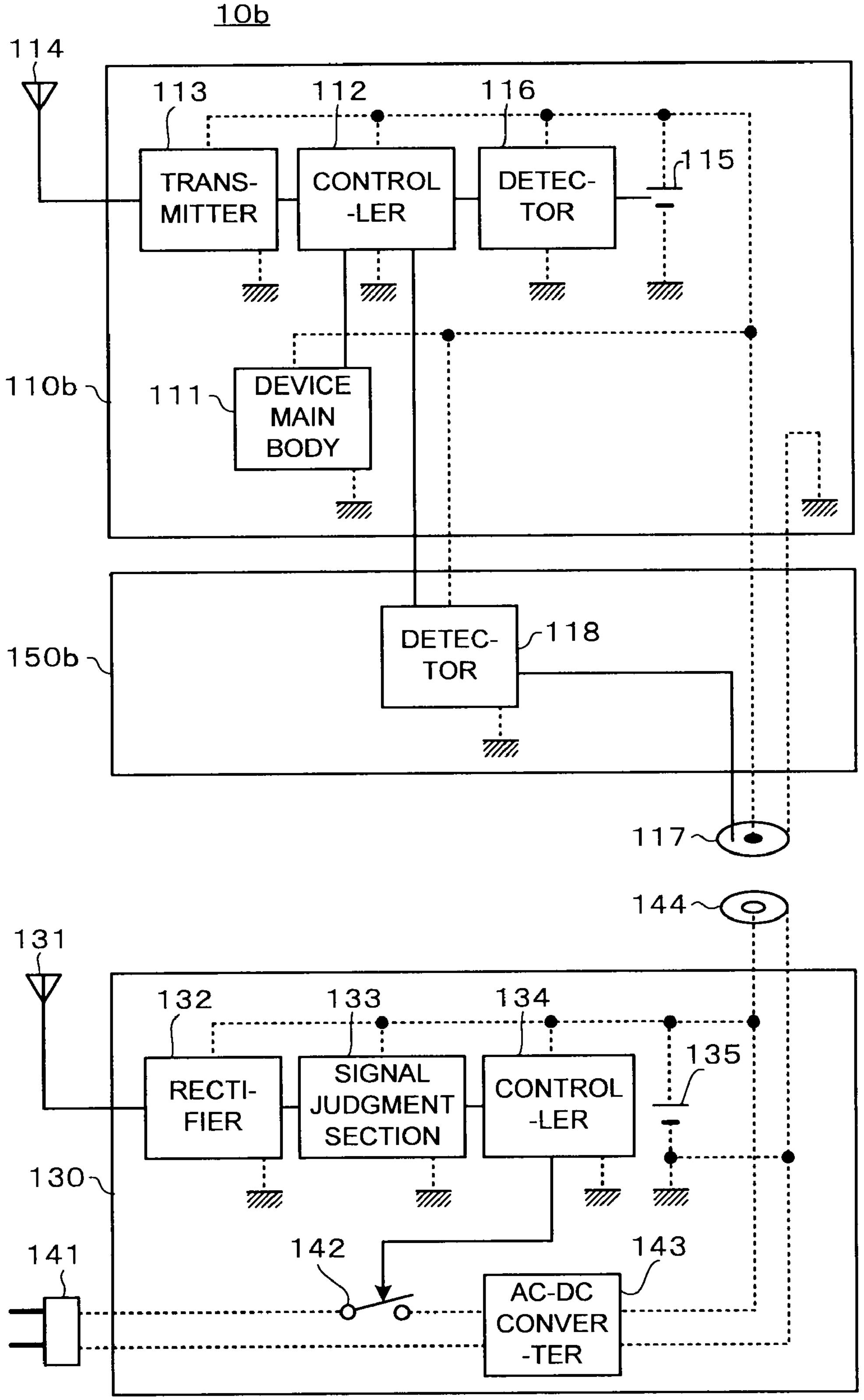
FIG. 4 is a block diagram showing an electronic system 10*b* according to a modification example 2 of the present invention.

FIG. 4 is a block diagram showing an electronic system 10*b* according to a modification example 2 of the present invention. In this modification example 2, the electronic device 110 of the electronic system 10 is divided into an electronic device main body 110*b* and a charger 150*b*. The charger 150*b* is a device for charging a battery 115, and a detector 118 is disposed therein. With regard to points other than the above, the electronic system 10*b* is virtually not different from the electronic system 10, and detailed explanation will be omitted.

(Operation of Electronic Device System 10)

Figure 5:
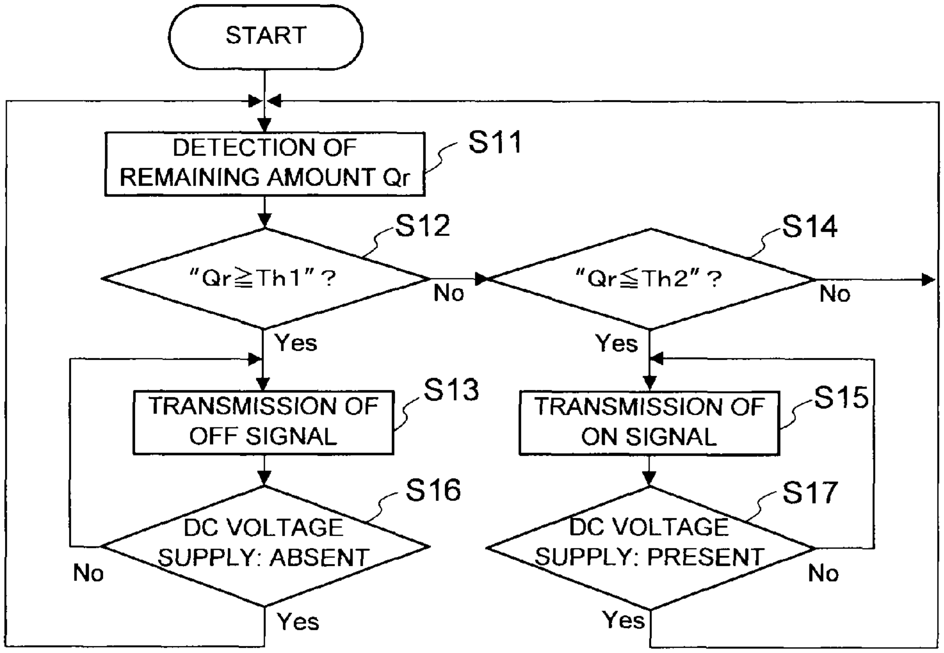
FIG. 5 is a flowchart showing an example of operating procedures of an electronic system.

Hereinafter, an operation of the electronic system 10 will be described. FIG. 5 is a flowchart showing an example of operating procedures of the electronic system 10. It should be noted that operating procedures of the electronic systems 10*a*, 10*b* can be also shown by FIG. 5.

Here, it is presumed that the electronic device 110 and the AC adaptor 130 are connected (the DC jack 117 and the DC plug 144 are connected) and that AC plug 141 is connected to the power source receptacle.

(1) Detection of Remaining Amount Qr of Battery 115 (Step S11)

A remaining amount Qr of the battery 115 is detected by the detector 116. As already described, based on the voltage or the like of the battery 115, the remaining amount Qr thereof is detected and indicated by, for example, percentage ("%").

(2) Generation and Transmission of Control Signal (Steps S12 to S15)

A control signal is generated by the controller 112 in correspondence with the detected remaining amount Qr. In other words, when the remaining amount Qr is equal to or more than a reference value Th1 (a first predetermined amount), an OFF signal is generated by the controller 112 and transmitted from the transmitter 113. When the remaining amount Qr is equal to or less than a reference value Th2 (a second predetermined amount), an ON signal is generated by the controller 112 and transmitted from the transmitter 113. As will be described later, the switch 142 is turned on/off by these ON signal and OFF signal, so that AC-DC conversion in the AC adaptor 130 is started/stopped.

Here, if the transmitter 113 and the controller 112 are realized by a CPU-containing LSI, it becomes possible to transmit the ON/OFF signal from the transmitter 113 without activating an operating system (OS) for controlling the device main body. Concretely, it is considered, presuming a notebook personal computer as the electronic device 110, to realize the transmitter 113 and the controller 112 by using, for example, an LSI for wireless LAN which contains a CPU. In such a case, as a result that a control signal is transmitted from the detector 116 to the LSI for wireless LAN, the ON/OFF signal can be transmitted from the transmitter 113 without activating the OS such as Windows.

As the reference values Th1, Th2, for example, values of about 80%, 90% and 20% to 40% can be adopted, respectively. It should be noted that if the remaining amount Qr is in between the reference values Th1 and Th2, the control signal is not generated. In other words, on such an occasion, the ON/OFF state of the switch 142 is kept as it is.

Generation and transmission of the control signal are repeated until supply of the electric power from the AC adaptor 130 is stopped or started (Steps S16, S17). For example, it is possible to transmit control signals repeatedly at a predetermined time-interval T1.

It should be noted that the number of transmission of the control signals can be specified. As the number, for example, a value of about 1 to 10 can be adopted. In such a case, later-described detection of presence/absence of supply of a DC voltage and stop of transmission corresponding to this detection are not necessary.

(3) Stop or Start of Supply of DC Voltage (Steps S16, S17)

The control signal transmitted from the transmitter 113 is received by the antenna 131 and rectified in the rectifier 132. Whether or not the control signal coincides with the OFF signal or the ON signal is judged by the signal judgment section 133. In correspondence with a judgment result of the above, the switch 142 is turned off/on by the controller 134. As a result, supply of an electric power from the Ac adaptor 130 to the electronic device 110 is stopped or started (steps S16, S17).

(4) Stop of Generation/Transmission of Control Signal (Steps S16, 17)

Presence/absence of supply of the electric power to the DC jack 117 is detected by the detector 118 (steps S16, S17). When the presence/absence of supply of the electric power and the transmitted control signal (the OFF signal, the ON signal) correspond to each other (stop/start of supply of the electric power), generation/transmission of the control signal is stopped.

(Example of Modified Operation)

Figure 6:
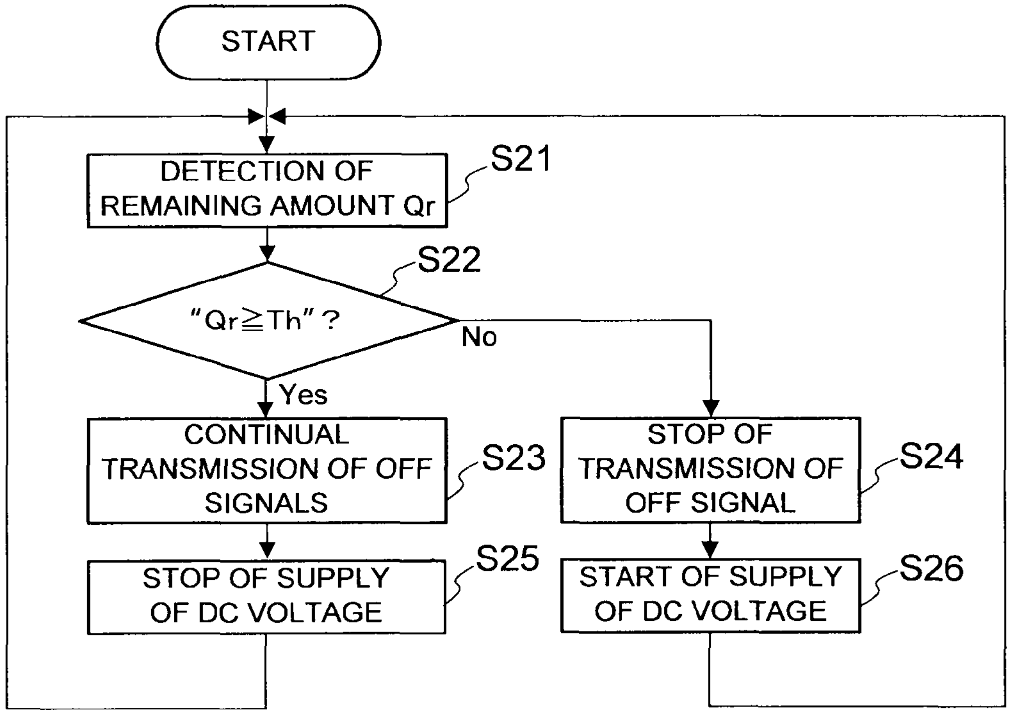
FIG. 6 is a flowchart showing a modification example of the operating procedures of the electronic system.
Figure 7:
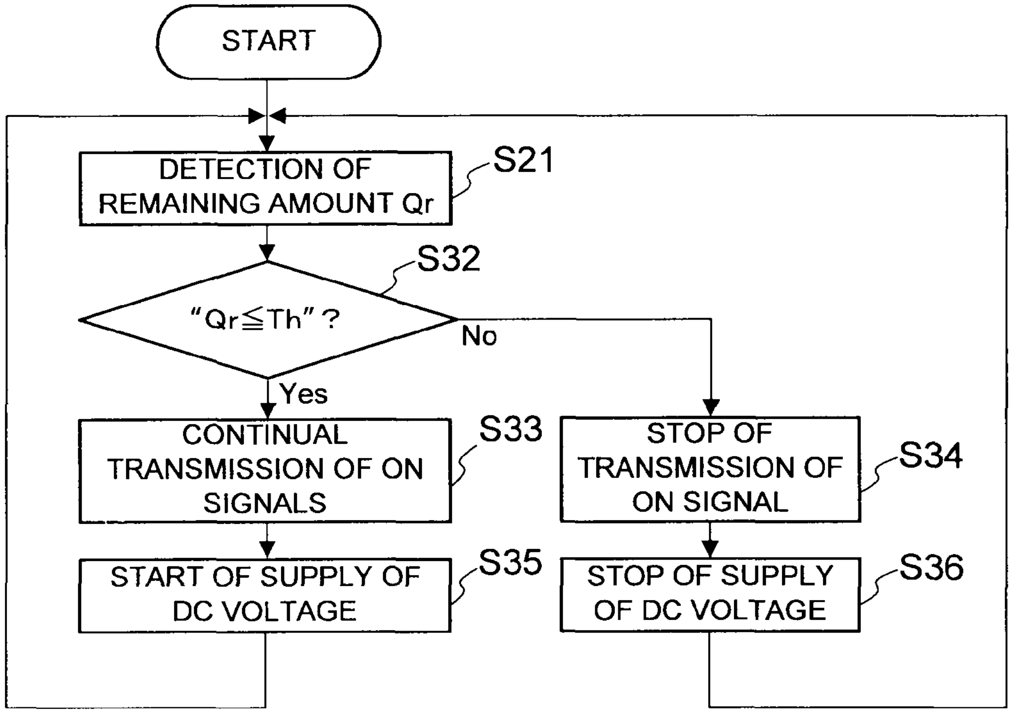
FIG. 7 is a flowchart showing a modification example of the operating procedures of the electronic system.

FIG. 6 and FIG. 7 are flowcharts showing modification examples of the operating procedures of the electronic system 10, respectively. It should be noted that operating procedures of the electronic systems 10*a*, 10*b* can be also shown by FIG. 6 and FIG. 7. In FIG. 5, the switch 142 is turned on/off based on transmission/reception of the ON signal/OFF signal. In contrast, in FIG. 6 and FIG. 7, the switch 142 is turned on/off based on whether or not signals are transmitted/received continually. Hereinafter, the operating procedures of the electronic system 10 will be described principally based on FIG. 6.

(1) Detection of Remaining Amount Qr of Battery 115 (Step S21)

A remaining amount Qr of the battery 115 is detected by the detector 116. As already described, based on a voltage or the like of the battery 115, the remaining amount Qr thereof is detected and indicated by, for example, percentage ("%").

(2) Generation and Transmission of Control Signal (Steps S22 to S24)

A control signal is generated by the controller 112 in correspondence with the detected remaining amount Qr.

In other words, when the remaining amount Qr is equal to or more than a reference value Th (a predetermined amount), OFF signals are generated and transmitted from the transmitter 113 continually. For example, the transmitter 113 transmits the OFF signals repeatedly at a predetermined time-interval T1. When the remaining amount Qr is smaller than the reference value Th (the predetermined amount), transmission of the OFF signal is stopped. It should be noted that a value of, for example, about 0.1 second to 2 or 3 minutes can be adopted as the time-interval T1 (also as a time-interval T2 described later).

On the other hand, in the example of FIG. 7, when a remaining amount Qr is equal to or less than a reference value Th (a predetermined amount), ON signals are generated and transmitted from the transmitter 113 continually (steps S32 to S34). For example, the transmitter 113 transmits the ON signals repeatedly at a predetermined time-interval T1. When the remaining amount Qr is larger than the reference value Th (the predetermined amount), transmission of the ON signal is stopped.

(3) Stop or Start of Supply of DC Voltage (Steps S25, S26)

In correspondence with whether or not the control signals are transmitted/received continually, the switch 142 is turned on/off by the controller 134. As a result, supply of an electric power from the Ac adaptor 130 to the electronic device 110 is stopped or started. Whether or not the control signals are transmitted/received continually can be judged by whether or not the control signals are received continually at a predetermined time-interval T2 (T2>T1). In other words, in a case that, after the control signal is received, the next control signal is received within the time T2, it is judged that the control signals are received (transmitted) continually. Further, in a case that, after the control signal is received, the next control signal is not received even if the time T2 passes, it is judged that continual reception (transmission) of the control signals is stopped.

In other words, when the OFF signals are being transmitted/received continually, the switch 142 is turned off and supply of a DC signal is stopped (step S25). Further, when the transmission/reception of the OFF signal is being stopped, the switch 142 is turned on and supply of the DC signal is restarted (step S26).

On the other hand, in the example of FIG. 7, when ON signals are being transmitted/received continually, the switch 142 is turned on and supply of a DC signal is started (step S35). Further, when transmission/reception of the ON signal is being stopped, the switch 142 is turned off and supply of the DC signal is stopped (step S36).

As described above, the switch 142 provided in the AC power source side of the AC-DC converter 143 is turned on/off by a radio signal. As a result, even if the electronic device 110 and the AC adaptor 130 are apart from each other, reduction of a standby power of the electronic device 110 becomes possible without troubling a user. By turning off the switch 142 automatically when the battery 115 mounted on the electronic device 10 is charged up to equal to or more than the predetermined level (the reference value Th1), the standby power can be reduced. Further, by turning off the switch 142 automatically, the battery 115 can be prevented from being overcharged with an electric power. In other words, it is possible to give the electronic system 10 an overcharge prevention function (an overcharge prevention device).

Further, since charging is started automatically when the remaining amount of the battery 115 mounted on the electronic device 110 is equal to or less than the predetermined level (the reference value Th2), it is possible to prevent the remaining amount of the battery 115 from being zero. Therefore, it becomes possible to prevent a problem that the remaining amount of the battery 115 becomes zero while the user is operating or starts operating the electronic device 110, disabling continuation of an operation.

It should be noted that, for example, when an overcharge prevention device for the battery 115 is provided in the electronic device 110, it is possible to provide a detector (not shown) detecting that the overcharging prevention device has stopped charging the battery 115. When the detector detects that charging to the battery 115 is stopped, the transmitter 113 transmits a control packet so that the switch 142 is turned off automatically.

Further, for the transmitter 113, there can be used a transmitter such as an LSI for wireless LAN, which has been conventionally contained in an electronic device 110. Thereby, it becomes possible to construct a system at a low cost without equipping the electronic device 110 with a new transmitter. For example, a notebook personal computer has a built-in LSI for wireless LAN at quite a high rate. Thus, by using that LSI for wireless LAN as the transmitter 113, an effect described above can be obtained with a low-cost construction.

PRACTICAL EXAMPLE

Figure 8:
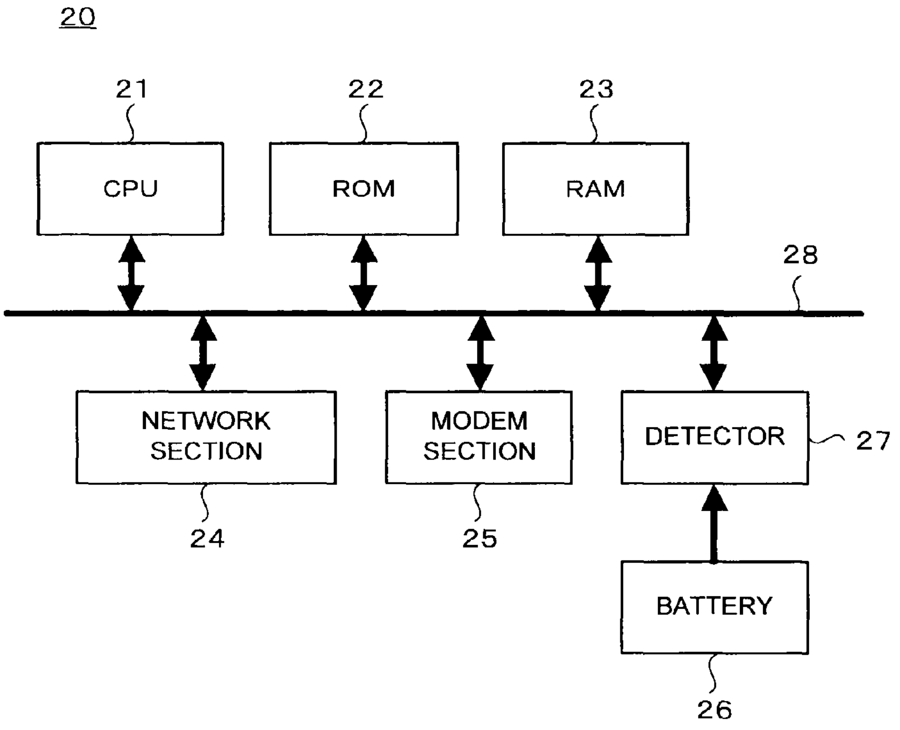
FIG. 8 is a block diagram showing an electronic device according to an embodiment of the present invention.

Next, a hardware constitution of an electronic device 20 according to a practical example will be described with reference to FIG. 8.

The electronic device 20 corresponds to the electronic device 110, and includes a control device such as a CPU 21, a storage device such as a ROM 22 and a RAM 23, a network section 24, a modem section 25, a battery 26, and a detector 27 detecting a remaining amount of the battery or power supply to the battery. The respective sections are connected to one another via a system bus 28.

The electronic device 20 can have a hardware constitution using an ordinary computer which includes an external storage device such as and an HDD and a CD (Compact Disc) drive device, a displaying device such as a display device, an input device such as a keyboard and a mouse, and a bus connecting the respecting sections.

The electronic device 20 connects with a LAN by the network section 24, and performs a reception processing of data received from an external device via the LAN and a transmission processing transmitting data to the external device via the LAN.

The electronic device 20 connects with a public circuit by the modem section 25 and performs the reception processing of facsimile data received from the external device via the public circuit and the transmission processing to transmit data to the external device via the public circuit. Further, the electronic device 20 transmits a control packet to an AC adaptor.

The CPU 21, the ROM 22, the RAM 23 and the like correspond to the controller 112 and the device main body of FIG. 1. It should be noted that the controller 112 and the device main body 111 can be constituted separately by providing a control device such as a second CPU.

The modem section 25 corresponds to the transmitter 113 and antenna 114 of FIG. 1. Further, the battery 26 corresponds to the battery 115, the detector 27 corresponds to the detector 116 and the detector 118. It should be noted that it can be constituted to have the detector 116 and the detector 118 separately.

A control program of the AC adaptor 130 to be executed in the electronic device 20 is provided by being recorded in a computer-readable storage medium such as a CD-ROM (Compact Disk Read Only Memory), a flexible disk (FD), a CD-R (Compact Disk Recordable), and a DVD (Digital Versatile Disk) as an installable form file or an executable file.

The control program of the AC adaptor 130 to be executed in the electronic device 20 can be provided by being stored in a computer connected to a network such as Internet and being downloaded via the network section or the modem section. Further, the control program of the AC adaptor 130 to be executed in the electronic device 20 can be provided or distributed via a network such as Internet.

Further, it can be constituted that the control program of the AC adaptor 130 is provided by being incorporated in the ROM or the like in advance.

The control program of the AC adaptor 130 to be executed in the electronic device 20 has a modular constitution including the above-described controller, and as actual hardware, the CPU (processor) 21 reads the control program of the AC adaptor 130 from the above-described storage medium and executes the program. As a result, the controller is loaded on a main storage and the above-described controller is generated on the main storage.

The control program of the AC adaptor 130 realizes, for example, the flowchart of FIG. 5, and, for example, if the electronic device 20 is in an ON state (a power is supplied to the respective sections from the battery 26), the control program is loaded on the main storage at every predetermined period and executed. In other words, a remaining amount of the battery 26 is detected at every predetermined period, and when the remaining amount is equal to or more than a predetermined value or equal to or less than a predetermined value, a control packet is transmitted to the AC adaptor 130.

On the other hand, when the electronic device 20 is in an OFF state (a power is not supplied to the respective sections from the battery 26), the electronic device 20, having a constitution further including a power supply controller with a timer, measures a predetermined period by the timer, and this power supply controller executes the AC adaptor control program at every predetermined period. On this occasion, the power supply controller keeps the electronic device in the OFF state.

Here, it is not necessary to make the electronic device 20 itself in the ON state, and it suffices if the power is supplied to the respective sections necessary for execution of the control program of the AC adaptor 130. For example, the power is not supplied to the display or the like. Thereby, compared with a case that the electronic device 20 itself is made in the ON state, power consumption can be saved.

Further, it is possible, after transmitting an OFF signal once, to estimate a time when the remaining amount of the battery 26 becomes equal to or less than a threshold value for transmitting an ON signal and to set the estimated time in the timer of the power supply controller. For example, estimation is possible from a self-discharge rate of the battery and a remaining amount of the battery at a transmission time of the OFF signal. Thereby, the number of transition of the electronic device 20 from the OFF state to the ON state to execute the control program of the AC adaptor 130 can be reduced.

The control program of the AC adaptor 130 can be made to be executed invariably when the electronic device 20 transits from the OFF state to the ON state. Thereby, a possibility that the remaining amount of the battery becomes zero before a predetermined period passes since the electronic device 20 becomes in the ON state can be reduced.

OTHER EMBODIMENTS

Embodiments of the present invention are not limited to the above-described embodiments and can be expanded or modified, and the expanded and modified embodiments are also included in the technical scope of the present invention.

In the above embodiment, the control signals (the ON signal, the OFF signal) are transmitted/received between a set of the device 110 and the AC adaptor 130. In such a case, it is possible, for example, to identify a transmission source (the device 110) and a receptor (the AC adaptor 130) by giving the device 110 and the AC adaptor 130 identifiers and also transmitting those identifiers at the transmission time of the control signal. Thereby, malfunction can be prevented even if a plurality of sets of devices 110 and AC adaptors 130 exists.

On the other hand, even when the plural sets of devices 110 and AC adaptors 130 exist, the AC adaptor can be controlled by using a common control signal (for example, not using or ignoring an identifier). For example, if a distance between each of the plural sets of devices 110 and AC adaptors 130 is sufficiently large, simplified control is possible in such a manner.

In the above-described embodiment, the transmitter 113 transmits the control signal by using a radio wave corresponding to a standard of a wireless LAN. On the other hand, it is possible to use a radio wave of another standard (for example, Bluetooth). A control signal can be also transmitted by using an infrared ray. Further, it is possible to transmit/receive a control signal by wire instead of by radio.

What is claimed is:

1. An electronic system, comprising:

an AC-DC converter to convert an AC voltage into a DC voltage and to supply the DC voltage to a secondary battery;

a first detector to detect a remaining amount of the secondary battery;

a transmitter to transmit a signal corresponding to the remaining amount of the secondary battery;

a receiver to receive the signal transmitted by the transmitter; and a controller to control the AC-DC converter using the signal received by the receiver.

2. The system according to claim 1, wherein the transmitter transmits a first signal when the remaining amount is larger than a first predetermined amount, and the controller instructs the AC-DC converter to stop AC-DC conversion upon receiving the first signal.

3. The system according to claim 2, further comprising a second detector to detect presence/absence of supply of the DC voltage to the secondary battery, wherein the transmitter transmits the first signals continually when the remaining amount is larger than the first predetermined amount, and the transmitter stops transmission of the first signal when the second detector detects that supply of the DC voltage is absent.

4. The system according to claim 2, wherein the transmitter transmits a second signal different from the first signal when the remaining amount is smaller than a second predetermined amount which is smaller than the first predetermined amount, and the controller starts AC-DC conversion by the AC-DC converter when the receiver receives the second signal.

5. The system according to claim 4, further comprising, a second detector to detect presence/absence of supply of the DC voltage to the secondary battery, wherein the transmitter transmits the second signals continually when the remaining amount is smaller than the second predetermined amount, and the transmitter stops transmission of the second signal when the second detector detects that the supply of the DC voltage is present.

6. The system according to claim 1, wherein the transmission of a predetermined signal from the transmitter is continued or stopped in correspondence with whether or not the remaining amount is larger than a predetermined amount, and the AC-DC conversion by the AC-DC converter is stopped or continued in correspondence with whether or not transmission of the predetermined signal from the transmitter is continued.

7. The system according to claim 6, wherein the transmission of a predetermined signal from the transmitter is continued when the remaining amount is larger than a predetermined amount, and the AC-DC conversion by the AC-DC converter is stopped when transmission of the predetermined signal from the transmitter is continued.

8. The system according to claim 6, wherein the transmission of a predetermined signal from the transmitter is continued when the remaining amount is smaller than a predetermined amount, and the AC-DC conversion by the AC-DC converter is continued when transmission of the predetermined signal from the transmitter is continued.

9. The system according to claim 6, wherein the transmitter transmits the predetermined signals at a first interval when transmission of the predetermined signal from the transmitter is continued, and the AC-DC conversion by the AC-DC converter is stopped or continued in correspondence with whether or not the predetermined signals are received at a second interval which is larger than the first interval.

10. The system according to claim 1, further comprising:

a receiver to receive the signal transmitted by the transmitter;

a rectifier to rectify the signal received by the receiver; and an identifier to identify the rectified signal, wherein the controller controls AC-DC conversion by the AC-DC converter based on an identification result in the identifier.

11. The system according to claim 1, wherein the transmitter transmits the signal by wireless, and the receiver receives the signal by wireless.

12. An electronic device, comprising:

an electronic device main body;

a secondary battery to supply electric power to the electronic device main body;

a detector to detect a remaining amount of the secondary battery; and a transmitter to transmit a signal corresponding to the remaining amount of the secondary battery to an AC-adapter to supply a DC voltage to the secondary battery.

13. An AC-adapter, comprising:

an AC-DC converter to convert an AC voltage into a DC voltage and to supply the DC voltage to a secondary battery of an electronic device;

a receiver to receive a signal corresponding to a remaining amount of the secondary battery from the electronic device; and a controller to control the AC-DC converter using the signal.

* * * * *